(12) United States Patent
Chen et al.

(10) Patent No.: US 8,512,445 B2
(45) Date of Patent: Aug. 20, 2013

(54) CARBONATE ABSORPTION SYSTEM AND PROCESS FOR CARBON DIOXIDE SEPARATION

(76) Inventors: Shiaoguo Chen, Pittsburgh, PA (US); Zijiang Pan, Amherst, NY (US)

( * ) Notice: Subject to any disclaimer, the term of this patent is extended or adjusted under 35 U.S.C. 154(b) by 407 days.

(21) Appl. No.: 12/821,302

(22) Filed: Jun. 23, 2010

(65) Prior Publication Data

US 2012/0164059 A1    Jun. 28, 2012

(51) Int. Cl.
*B01D 53/14* (2006.01)

(52) U.S. Cl.
USPC .......... 95/159; 95/165; 95/166; 95/196; 95/197; 95/205; 95/210; 95/227; 95/228; 95/236; 423/232

(58) Field of Classification Search
USPC ........... 423/437–438, 232–234, 242; 95/187, 95/195
See application file for complete search history.

(56) References Cited

U.S. PATENT DOCUMENTS

| | | | |
|---|---|---|---|
| 2,718,454 A * | 9/1955 | Wylie | 423/229 |
| 2,886,405 A | 5/1959 | Benson et al. | |
| 4,510,124 A * | 4/1985 | Sears et al. | 423/437.1 |
| 7,641,717 B2 * | 1/2010 | Gal | 95/187 |
| 7,998,714 B2 * | 8/2011 | Gellett et al. | 435/168 |
| 2011/0061533 A1 * | 3/2011 | Black et al. | 95/195 |
| 2011/0064636 A1 * | 3/2011 | Petig et al. | 423/234 |

FOREIGN PATENT DOCUMENTS

DE     2611454     * 9/1977

OTHER PUBLICATIONS

J. S. Tosh et al., "Equilibrium Study of the System Potassium Carbonate, Potassium Bicarbonate, Carbon Dioxide, and Water", Report of Investigations 5484, Bureau of Mines, 1959, pp. 1-23.
H. E. Benson et al., "CO2 Absorption Employing Hot Potassium Carbonate Solutions", Chemical Engineering Progress, vol. 50, No. 7, 1954, pp. 356-364.
H. E. Benson et al., "Improved Process for CO2 Absorption Uses Hot Carbonate Solutions", Chemical Engineering Progress, vol. 52, No. 10, 1956, pp. 433-438.
A. L. Kohl et al., "Alkaline Salt Solutions for Acid Gas Removal", Chapter 5, Gas Purification, 5th Edition, Houston:Gulf Publishing, Houston, 1997, pp. 330-414.

* cited by examiner

*Primary Examiner* — Duane Smith
*Assistant Examiner* — Minh-Chau Pham
(74) *Attorney, Agent, or Firm* — Eckert Seamans Cherin & Mellott, LLC; Carol A. Marmo

(57) ABSTRACT

The present invention relates to systems and processes for reducing the amount of carbon dioxide in a carbon dioxide-containing gas. In particular, the carbon dioxide-containing gas is contacted with a carbonate-containing solution. At least a portion of carbon dioxide in the carbon dioxide-containing gas is absorbed in the carbonate-containing solution to produce a carbon dioxide-, carbonate-containing solution. A heat recovery mechanism is employed to recover heat from the carbon dioxide-, bicarbonate-, carbonate-containing solution exiting the chamber to maintain the temperature of the chamber within a range of from about 50° C. to about 90° C.

5 Claims, 3 Drawing Sheets

Schematic Diagram of a Hot Carbonate Absorption Process

Schematic Diagram of a Hot Carbonate Absorption Process

Process Diagram of Heat Recovery Configuration

Flow Diagram of Alternative Heat Recovery Mechanism

CARBONATE ABSORPTION SYSTEM AND PROCESS FOR CARBON DIOXIDE SEPARATION

FIELD OF THE INVENTION

The present invention relates to a system and process for separating carbon dioxide from carbon dioxide-containing gas streams. In particular, the present invention is useful for at least partially absorbing and removing carbon dioxide from carbon dioxide-containing flue gas streams generated in a combustion facility.

BACKGROUND OF THE INVENTION

Carbon dioxide gas is produced as a by-product in various manufacturing processes, including, but not limited to, coal-fired power plants used to generate heat to produce electricity. The carbon dioxide is typically released into the atmosphere. The release of carbon dioxide into the atmosphere has the potential to evolve into a significant environmental challenge. For example, the accumulation of carbon dioxide in the atmosphere is increasingly being linked to global climate-warming. Further, there are projections of continued warming in the absence of effectively managing and reducing the amount of carbon dioxide released into the atmosphere. It is generally desirable to sequester carbon dioxide produced during manufacturing processes in order to reduce the release of this gas into the atmosphere.

A variety of options have been proposed to reduce or minimize carbon dioxide emissions. One option is to install carbon capture and sequestration ("CCS") systems in various power-generating facilities. CCS includes the capture, transportation and storage of carbon dioxide. The capture of carbon dioxide from flue gas generated in a power plant can be a very costly process. A typical pulverized coal power plant equipped with a monoethanolamine ("MEA") based carbon dioxide capture process can result in an 80% increase for the cost of electricity generated as compared to the same power plant without the CCS equipment and process. The high cost of the carbon dioxide capture process is due, at least in part, to the intensive energy consumption. The energy cost of the MEA process can account for about 60% of the total CCS cost. Thus, it is believed that a reduction in energy consumption is important to the reduction of the total cost of carbon dioxide capture process. Total energy usage can consist of three components: steam extraction, compression work and auxiliary work. Compression work is the work required to compress carbon dioxide from operating pressure (e.g., about 2 atm) in a stripping column to the pipeline transportation-ready pressure (e.g., 150 atm). Auxiliary work includes, among others, the energy consumption of the circulation pump and pressure drop in absorption columns.

It is desired to provide an effective and efficient system or process that will capture the carbon dioxide from a carbon dioxide-containing gas stream, and a system or process that does not have significant capital and operational costs associated therewith.

SUMMARY OF THE INVENTION

In one aspect, the present invention provides a system for reducing the amount of carbon dioxide in a carbon dioxide-containing gas. The system includes a chamber. A carbon dioxide-containing gas and a carbonate-containing solution enter the chamber. In the chamber, the carbon dioxide-containing gas is contacted with the carbonate-containing solution. At least a portion of carbon dioxide in the carbon dioxide-containing gas is absorbed in the carbonate-containing solution to produce a carbon dioxide-, carbonate-containing solution. The system further includes a heat recovery mechanism to transfer heat from the carbon dioxide-, carbonate-containing solution exiting the chamber to the carbonate-containing solution such that the temperature in the chamber is from about 50° C. to about 90° C.

In another aspect, the present invention provides a process for reducing the amount of carbon dioxide in a carbon dioxide-containing gas stream. The process includes introducing the carbon dioxide-containing gas stream and a carbonate-containing solution into a chamber; contacting the carbon dioxide-containing gas stream and the carbonate-containing solution in the chamber such that at least a portion of carbon dioxide from the carbon dioxide-containing gas stream is absorbed in the carbonate-containing solution; converting at least a portion of the carbon dioxide and the carbonate in the carbonate-containing solution to bicarbonate to produce a carbon dioxide-, bicarbonate-, carbonate-containing solution; transferring at least a portion of heat from the carbon dioxide-, bicarbonate-, carbonate-containing solution exiting the chamber to the carbonate-containing solution such that the temperature of the chamber is from about 50° C. to about 90° C.; precipitating a bicarbonate-containing solid out of the carbon dioxide-, bicarbonate-, carbonate-containing solution; concentrating the bicarbonate-containing solid to a bicarbonate-containing slurry; and stripping the bicarbonate-containing slurry to produce a carbon dioxide product.

In still another aspect, the present invention provides a process for reducing the amount of carbon dioxide in a flue gas stream which is generated from a fossil fuel combustion system. The process includes introducing the flue gas stream and a carbonate-containing solution into an absorption column; contacting the flue gas stream with the carbonate-containing solution in the absorption column; reacting carbon dioxide in the flue gas stream with carbonate in the carbonate-containing solution to produce a carbon dioxide-, bicarbonate-, carbonate-containing solution; transferring at least a portion of heat from the carbon dioxide-, bicarbonate-, carbonate-containing solution exiting the chamber to the carbonate-containing solution such that the temperature of the chamber is from about 50° C. to about 90° C.; precipitating in a separating chamber a bicarbonate-containing solid out of the carbon dioxide-, bicarbonate-, carbonate-containing solution, wherein the separating chamber includes a carbon dioxide-, bicarbonate-, carbonate-containing solvent that has a solubility of bicarbonate in water that is less than the solubility in water of the carbon dioxide-, bicarbonate-, carbonate-containing solution in the absorption column; concentrating the bicarbonate-containing solid to form a bicarbonate-containing slurry; stripping the bicarbonate-containing slurry in a pressurized stripping column to produce a carbon dioxide product, wherein the stripping column has a pressure in the range of from 5 to 60 bar.

BRIEF DESCRIPTION OF THE DRAWINGS

A further understanding of the invention can be gained from the following description of certain embodiments when read in conjunction with the accompanying drawings in which.

DETAILED DESCRIPTION OF THE INVENTION

Figure 1:
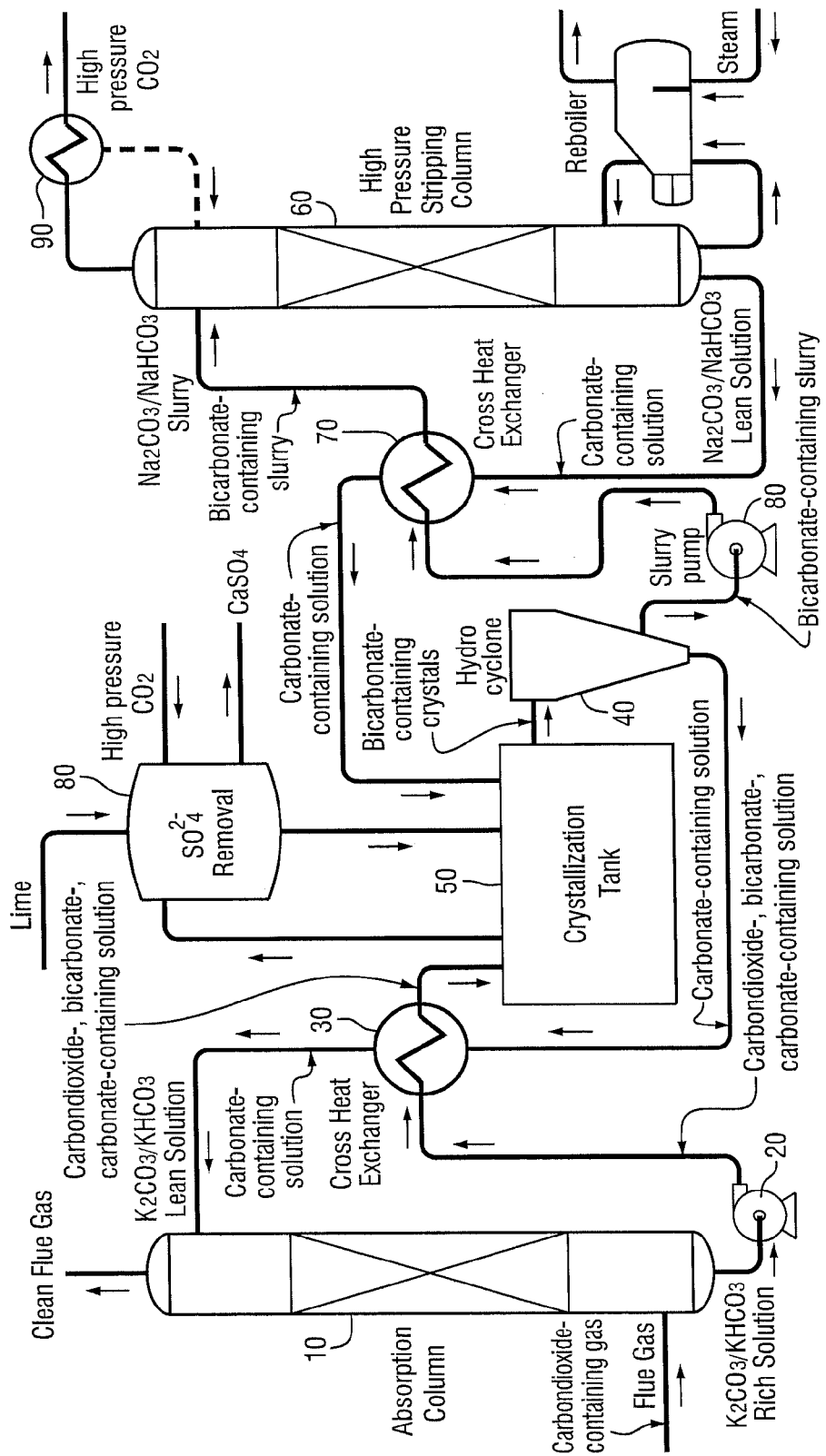
FIG. 1 is a schematic diagram of a hot carbonate absorption process, in accordance with certain embodiments of the invention.

The present invention relates to a system and process for separating carbon dioxide from a carbon dioxide-containing gas stream. The carbon dioxide-containing gas stream can be generated from various combustion systems or facilities, such as, a fossil fuel-burning combustion facility, a fossil fuel-fired boiler, and the like. The present invention includes introducing a carbonate-containing solution to the carbon dioxide-containing gas stream. The carbonate-containing solution and the carbon dioxide-containing gas stream can be introduced into a closed absorption chamber. The introduction can be such that the carbonate-containing solution and the carbon dioxide-containing gas stream flow countercurrent to each other. For example, the carbonate-containing solution can enter the top of the chamber and flow downward there through, and the carbon dioxide-containing gas stream can enter the bottom of the chamber and flow upward there through. As a result of contact between the carbonate-containing solution and the carbon dioxide-containing gas stream, the carbonate-containing solution is effective to absorb at least a portion of the carbon dioxide from the carbon dioxide-containing gas stream. The temperature at which the carbonate-containing solution and the carbon dioxide-containing gas stream are contacted, can vary. Typically, the contact is conducted at an elevated temperature. In alternate embodiments, the temperature in the chamber is in the range of from about 50° C. to about 90° C., or from about 55° C. to about 85° C., or from about 60° C. to about 80° C. The gas stream contains a smaller or reduced amount of carbon dioxide after contact with the carbonate-containing solution than it contained prior to the contact and the carbonate-containing solution contains a greater or increased amount of carbon dioxide after contact with the gas stream than it contained prior to the contact. Thus, a carbon dioxide-, carbonate-containing solution is produced as a result of contacting the carbon dioxide-containing gas stream with the carbonate-containing solution. The carbon dioxide-, carbonate-containing solution can further contain bicarbonate due to an at least partial reaction of the carbon dioxide and other components, which may be contained in the gas stream, with the carbonate. Thus, a carbon dioxide-, bicarbonate-, carbonate-containing solution can be produced as a result of contacting the carbon dioxide-containing gas stream with the carbonate-containing solution. Further, in one embodiment wherein the carbon dioxide-containing gas stream also contains sulfur dioxide, the carbonate-containing solution can be effective to remove sulfur dioxide from the gas stream, in addition to removing carbon dioxide. During the absorption process, the sulfur dioxide is absorbed by the carbonate-containing solution to form $SO_3^{2-}$ which is subsequently oxidized to $SO_4^{2-}$ by oxygen that is also contained in the gas stream.

In the present invention, the conversion of carbonate to bicarbonate is relatively low. In alternate embodiments, from about 10% to about 50%, or from about 15% to about 45%, or from about 20% to about 40% of the carbonate in the carbonate solution is converted to bicarbonate. Without intending to be bound by any particular theory, it is believed that a low bicarbonate conversion percentage or rate increases the alkalinity of the absorption solution. The pH of the carbonate-containing solution is a function of the bicarbonate conversion percentage or rate. If the carbonate to bicarbonate conversion is low, the pH of the carbonate-containing solution will be high and the rate of reaction will be high. Thus, in the present invention, the low rate of conversion from carbonate to bicarbonate can result in a high rate of absorption of carbon dioxide.

The carbonate-containing solution can include a variety of carbonate materials known in the art. In one embodiment, the carbonate-containing solution that is contacted with the carbon dioxide-containing gas to at least partially absorb the carbon dioxide therefrom, includes potassium carbonate ($K_2CO_3$), sodium carbonate ($Na_2CO_3$), and mixtures thereof. In alternate embodiments, lithium carbonate, rubidium carbonate, cesium carbonate and mixtures thereof, can be used. In another embodiment, it is desired to employ a carbonate for absorption (in the chamber) that has a high solubility in water, such as, for example, potassium carbonate. Due to its high solubility, potassium carbonate can be used in the absorption chamber at higher concentrations. The higher concentration in solution can increase the capacity of the absorption solution to absorb carbon dioxide from the carbon dioxide-containing gas stream and therefore, reduce the amount of the solution needed.

The amount of carbonate in the solution can vary. In one embodiment, the carbonate-containing solution includes from about 30% to about 50% of carbonate equivalent based on the weight of the solution. The carbonate-containing solution can include other components, in addition to the carbonate component, such as, for example, bicarbonate, water and mixtures thereof.

The carbon dioxide-containing gas stream and carbonate-containing solution are typically contacted within a closed chamber. Following contact therein, the gas stream (which contains less carbon dioxide as a result of the contact) exits the chamber into the atmosphere as a cleaned gas stream. The carbon dioxide-, carbonate-containing solution, which can contain more bicarbonate than prior to the carbonate-containing solution entering the chamber, exits the chamber and is subjected to a heat recovery mechanism. The heat recovery mechanism includes transferring heat from the hot carbon dioxide-, carbonate- (and optionally bicarbonate-) containing solution to the carbonate-containing solution. The heat recovery mechanism can be capable of transferring heat to the carbonate-containing solution either before the carbonate-containing solution enters the absorption chamber or after the carbonate-containing solution is fed into the absorption chamber. Further, as part of the heat recovery mechanism, the hot carbon dioxide-, carbonate- (and optionally bicarbonate-) containing solution is cooled and introduced into a separation tank.

In an embodiment, a cleaned gas stream exits from the top of the chamber and a carbon dioxide-, bicarbonate-, carbonate-containing solution exits from the bottom of the chamber. The hot carbon dioxide-, bicarbonate-, carbonate-containing solution is pumped to a heat exchanging device. Further, a cooled carbonate-containing solution also enters the heat exchanging device. In the heat exchanging device, heat is transferred from the hot carbon dioxide-, bicarbonate-, carbonate-containing solution to the cooled carbonate-containing solution. As a result, the heated carbonate-containing solution exits the heat exchanging device and enters the absorption column, and the cooled carbon dioxide-, bicarbonate-, carbonate-containing solution exits the heat exchanging device and enters a separating tank.

In the separating tank, the bicarbonate in the carbon dioxide-, bicarbonate-, carbonate-containing solution is precipitated out of solution (e.g., crystallized). In alternate embodiments, the separating tank can be a crystallization tank or any other type of device which is effective to separate the bicarbonate-containing solid, such as, but not limited to, crystals, from the liquid solution. For example, in one embodiment, a hydrocyclone can be used to separate the bicarbonate from the carbon dioxide-, bicarbonate-, carbonate-containing solution and produce a bicarbonate-containing slurry. The bicarbonate-containing slurry is then fed into a pressurized stripping column and is regenerated. The regenerated solution from the pressurized stripping column is recycled back to the separating tank. A carbonate-containing solution, which may also contain a small amount of bicarbonate, exits the separating tank and is recycled to the absorption chamber after being subjected to the heat recovery mechanism previously described.

The present invention is applicable to a wide variety of processes and systems that include carbon dioxide-containing gas streams and is not limited to use with any particular process or system. For ease of description, the present invention will be described herein in accordance with a particular embodiment wherein the carbon dioxide-containing gas stream is flue gas which is generated in a coal-fired power plant.

As shown in FIG. 1, flue gas from a fossil fuel-fired power plant is introduced into an absorption column 10. The absorption column 10 can include a wide variety of such equipment known in the art such as, but not limited to, for example, tray columns (e.g., sieve tray, valve tray or bubble cap tray) and packed columns (structured or non-structured). In one embodiment, a tray column is used having approximately 40 trays. The temperature in the absorption column 10 can vary, as previously discussed. In one embodiment, wherein a tray column is employed, at least some of the trays have an absorption temperature of about 79° C. or about 80° C. The flue gas enters the bottom of the absorption column 10. The flue gas is typically at a temperature within the range of from about 60° C. to about 200° C. or from about 100° C. to about 200° C. In one embodiment, the flue gas is at a temperature of about 150° C. The flue gas flows upward through the absorption column 10 and is in contact countercurrent with a carbonate-containing solution which enters the absorption column 10 at the top and flows downward through the absorption column 10. Carbon dioxide, sulfur dioxide and other acidic gases which may be present in the flue gas are at least partially absorbed into the carbonate-containing solution as a result of the contact between the carbonate-containing solution and the flue gas. The absorption of the carbon dioxide and sulfur dioxide in the carbonate-containing solution results in the formation of bicarbonate, sulfate and other salts in the solution. The flue gas containing less carbon dioxide (cleaned flue gas) exits the top of the absorption column 10 and passes through a stack (not shown) to the atmosphere. The carbon dioxide-, carbonate-containing solution, which may contain various other components absorbed from the flue gas, exits the bottom of the absorption column 10. In FIG. 1, the carbon dioxide-, carbonate-containing solution further contains bicarbonate.

Various heat recovery configurations can be used to recover heat from the hot carbon dioxide-, bicarbonate-, carbonate-containing solution that exits the bottom of the absorption column 10. This solution may also be referred to as a carbon dioxide rich solution. The temperature of the carbon dioxide-, bicarbonate-, carbonate-containing solution can vary. In one embodiment, the temperature is elevated above room temperature. In another embodiment, the temperature is within the temperature range in the absorption chamber (i.e., absorption column 10), as previously discussed.

Figure 2:
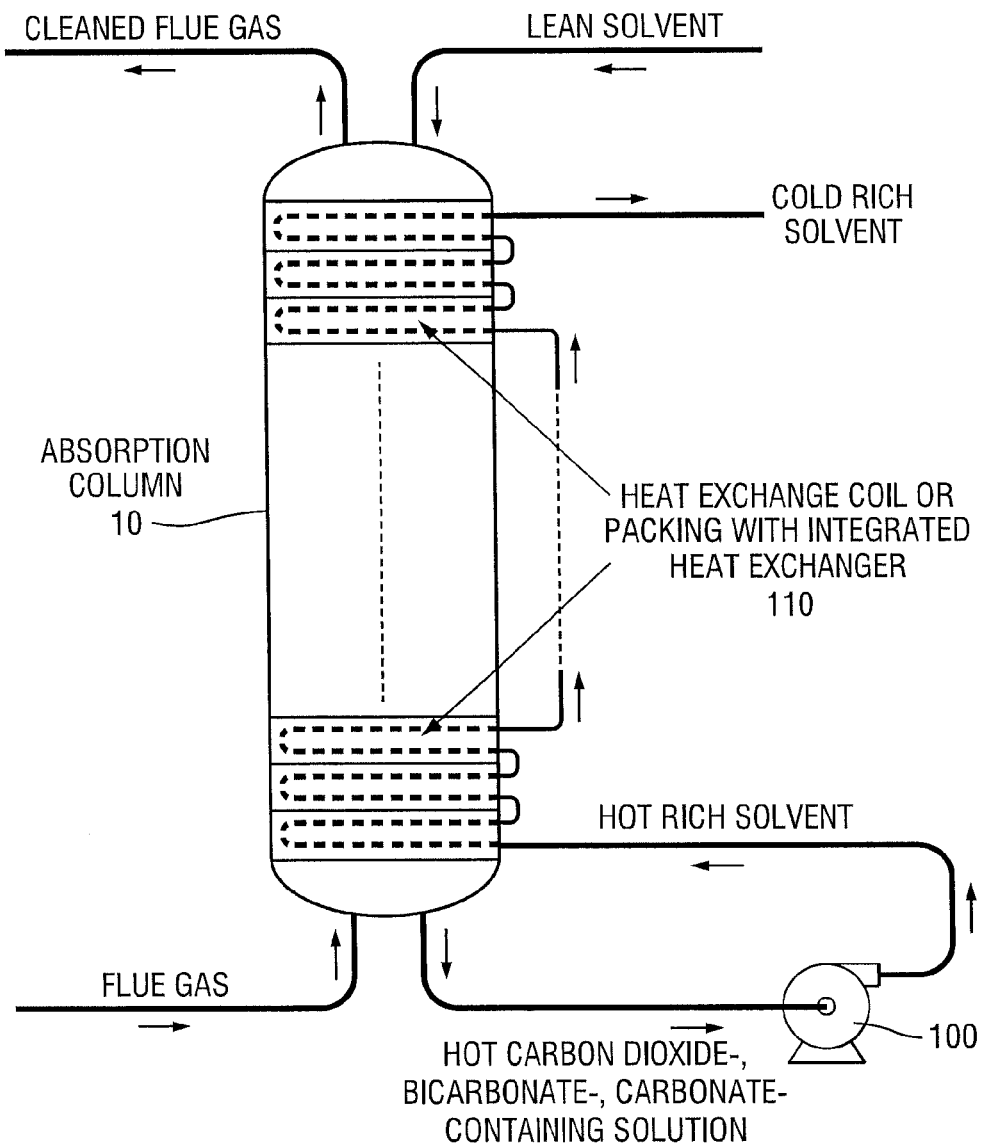
FIG. 2 is a process diagram of a heat recovery configuration, in accordance with certain embodiments of the invention.

As shown in FIG. 2, the hot carbon dioxide-, bicarbonate-, carbonate-containing solution from the absorption column 10 can exit the bottom of the absorption column 10 and enter the pump 100. The pump 100 can pump the hot carbon dioxide-, bicarbonate-, carbon-containing solution there through such that the hot carbon dioxide-, bicarbonate-, carbon-containing solution is reintroduced into a structured packing 110 of the absorption column 10. The structured packing 110 can include an integrated heat exchanging mechanism to transfer heat to the absorption fluid (i.e., carbonate solution) flowing downward in the absorption column 10.

Figure 3:
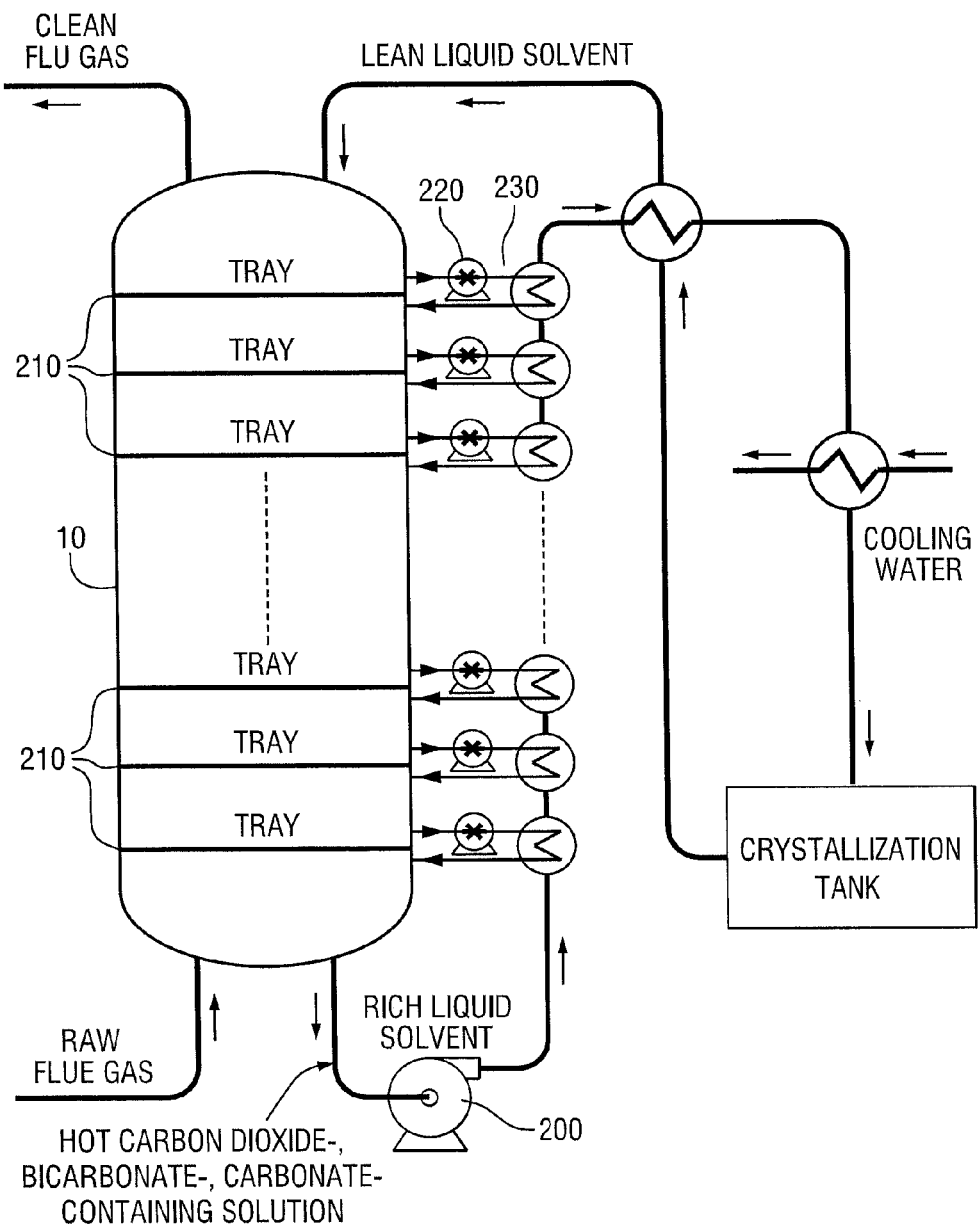
FIG. 3 is a flow diagram of an alternative heat recovery mechanism, in accordance with certain embodiments of the invention.

Further, as shown in FIG. 3, the hot carbon dioxide-, bicarbonate-, carbonate-containing solution can exit from the bottom of the absorption column 10 and can be fed into pump 200. The absorption column 10 can be a tray column having a plurality of trays 210 positioned therein. A side stream can be extracted from each of trays 210 of the absorption column 10. The side stream can be fed to a pump 220 associated with each of trays 210 and the pump 220 can pump the side stream to a heat exchanger 230. In the heat exchanger 230, the side stream and the hot carbon dioxide-, bicarbonate-, carbonate-containing solution (which exits pump 200 and is feed into the heat exchanger 230) are flowing there through. The side stream has a temperature which is less than the temperature of the hot carbon dioxide-, bicarbonate-, carbonate-containing solution which is fed from the absorption column 10. In the heat exchanger 230, there is a delta temperature between the two streams. The delta temperature can vary. In one embodiment, a delta temperature of at least 5° C. is employed. The heat from the hot carbon dioxide-, bicarbonate-, carbonate-containing solution is exchanged with the side stream such that the hot carbon dioxide-, bicarbonate-, carbonate-containing solution is cooled and the side stream is heated. The heated side stream exits the heat exchanger 230 and is fed back into the absorption column 10. The number of heat exchangers can vary. In one embodiment, the number of heat exchangers employed can be the same as the number of trays employed and in another embodiment, the number of heat exchangers employed can be different from the number of trays employed.

Alternatively, in one embodiment, as shown in FIG. 1, a stream of the hot carbon dioxide-, bicarbonate-, carbonate-containing solution is pumped from the bottom of the absorption column 10 by a pump 20 to a heat exchanger 30. A carbonate-containing stream is fed from a hydrocyclone 40 and also enters the heat exchanger 30. This carbonate-containing stream has a temperature which is less than the temperature of the carbon dioxide-, bicarbonate-, carbonate-containing solution stream which is fed from the absorption column 10. In the heat exchanger 30, there is a delta temperature between the two streams. The delta temperature can vary. In one embodiment, a delta temperature of at least 5° C. is employed. The carbonate-containing stream from the hydrocyclone 40 is typically at a temperature ranging from about 20° C. to about 35° C. The carbon dioxide-, bicarbonate-, carbonate-containing solution stream which exits from the absorption column 10 transfers heat to the carbonate-containing stream from the hydrocyclone 40 in the heat exchanger 30. The heated carbonate-containing stream exits the heat exchanger 30 and is fed into the top of the absorption column 10. The cooled carbon dioxide-, bicarbonate-, carbonate-containing solution stream exits the heat exchanger 30 and is fed into the crystallization tank 50.

In one embodiment, the cooled carbon dioxide-, bicarbonate-, carbonate-containing solution entering the crystallization tank 50 may be further cooled using conventional means (not shown) prior to entering the crystallization tank 50. The temperature of the cooled carbon dioxide-, bicarbonate-, carbonate-containing solution can vary. In one embodiment, the temperature is from about 20° C. to about 35° C. In the crystallization tank 50, the cooled carbon dioxide-, bicarbonate-, carbonate-solution is mixed with a cooled carbonate-containing solution. The cooled carbonate-containing solution is fed into the crystallization tank 50 from a pressurized stripping column 60 via a cross heat exchanger 70. The cooled carbonate-containing solution can include a variety of carbonate materials known in the art, such as, but not limited to, those previously described for use in the absorption chamber (e.g., absorption column 10). In one embodiment, the cooled carbonate solution entering the crystallization tank 50 from the pressurized stripping column 60 via the cross heat exchanger 70, includes sodium carbonate. The temperature of the cooled carbonate-containing solution can vary. In one embodiment, the temperature of the cooled carbonate-containing solution is from about 20° C. to about 35° C. In the crystallization tank 50, the mixed solution can be over saturated at a selected temperature and the bicarbonate (e.g., sodium bicarbonate) in the solution can be crystallized out. The temperature in the crystallization tank 50 is typically in the range of from about 20° C. to about 35° C. The bicarbonate-containing crystals exit the crystallization tank 50 and are fed into the hydrocyclone 40 to be concentrated and formulated into a bicarbonate-containing slurry. The composition of the slurry can vary. In one embodiment, the slurry can include bicarbonate, carbonate, carbon dioxide, water and mixtures thereof. The amounts of each of the components of the slurry can also vary. In one embodiment, for example, the slurry can contain about 84% by weight bicarbonate, 6% by weight carbonate and 10% by weight water. The slurry is then pumped through a slurry pump 80 to cross heat exchanger 70. In the cross heat exchanger 70, the slurry exchanges heat with the regenerated carbonate-containing solution which exits from the pressurized stripping column 60 and is also fed into the cross heat exchanger 70. The regenerated carbonate-containing solution exits the cross heat exchanger 70 and is fed into the crystallization tank 50. The slurry exits the cross heat exchanger 70 and enters the pressurized stripping column 60. The pressurized stripping column 60 can operate at various high pressures. In one embodiment, the pressure is in the range of from 5 to 60 bar. In the pressurized stripping column 60, at least a portion of the carbon dioxide contained in the form of bicarbonate within the slurry is stripped therefrom and the carbon dioxide exits the top of the pressurized stripping column 60. In one embodiment, the carbon dioxide which exits from the pressurized stripping column 60 is a high pressure carbon dioxide product. In alternate embodiments, "high pressure" means a pressure greater than about 2 atm, or greater than about 5 atm, or greater than about 10 atm, or from about 5 atm to about 60 atm. The carbon dioxide released from the pressurized stripping column 60 can be cooled in the heat exchanger 90, further compressed as needed and dehydrated to a sequestration-ready product. The slurry passes through the pressurized stripping column 60 and the solid, e.g., crystals, in the slurry can be at least partially dissolved as carbon dioxide is stripped out. The solution will contain less bicarbonate following the stripping process. The solution, containing a reduced amount of bicarbonate, exits the bottom of the pressurized stripping column 60 and is then regenerated. As previously described, the regenerated carbonate-containing solution enters the cross heat exchanger 70 wherein it is cooled (e.g., heat from the regenerated solution is exchanged with the bicarbonate-containing slurry from the hydrocyclone 40 that also enters the cross heat exchanger 70). The cooled carbonate-containing solution then is fed to the crystallization tank 50.

In one embodiment, a series of heated flashers can be employed in the stripping process. The number of heated flashers used can vary and can typically range from 1 to 10. In a preferred configuration, a pressurized stripping column is provided following a series of flashers.

A small stream is extracted from the solution in the crystallization tank 50 and fed into the sulfate removal system 80 to essentially remove the sulfate present in the solution. In an embodiment, the sulfate removal system 80 includes the following configuration. A slip stream of sulfate-, carbonate-containing solution is removed from the crystallization tank 50, or directly from the absorber column 10 and introduced into a sulfate removal reactor. Hydrated lime is added to the solution to precipitate sulfate out of the solution. Both $CO_3^{2-}$ and $SO_4^{2-}$ are present in the solution and since the solubility of $CaSO_4$ is much greater than that of the $CaCO_3$, a greater amount of $CaCO_3$ will precipitate than $CaSO_4$. Thus, to reduce the $CaCO_3$ precipitation, the concentration of $CO_3^{2-}$ is reduced. The concentration of $CO_3^{2-}$ is related to the solution pH. $CO_3^{2-}$ concentration decreases with a decrease in pH. Thus, to lower the solution pH, a small portion of carbon dioxide is recycled after it is compressed to high pressure and introduced into the slip stream of the sulfate-, carbonate-containing solution. The high pressure carbon dioxide can dissolve into the solution and lower the pH of the solution. Depending on the pressure of the carbon dioxide, the concentration of $CO_3^{2-}$ and pH value can be effectively lowered.

In the present invention, it is desired to optimize the amount of bicarbonate in the solution that can be crystallized in the crystallization tank. Crystallizing more bicarbonate out of solution can increase the ability of the carbonate-containing absorption solution to absorb carbon dioxide from the carbon dioxide-containing gas stream. Thus, if a less soluble bicarbonate, such as, but not limited to, sodium bicarbonate, is used in the crystallization process, an increased amount of bicarbonate can be crystallized out of solution and the remaining solution that is fed back into the absorption chamber will have a lower bicarbonate concentration which, in addition to increasing the ability to absorb carbon dioxide, will also increase the pH of the absorption solution and the reaction rate. In one embodiment, sodium carbonate, sodium bicarbonate or mixtures thereof, is used for the carbon dioxide stripping process and potassium carbonate, potassium bicarbonate or mixtures thereof is used for the carbon dioxide absorption process. Since sodium carbonate and sodium bicarbonate have a lower solubility in water than potassium carbonate and potassium bicarbonate, a greater amount of sodium bicarbonate will be crystallized out of solution in the crystallization tank than the potassium bicarbonate. Thus, the solution exiting the crystallization tank will contain a decreased amount of potassium bicarbonate which is then fed back into the absorption chamber.

The use of sodium bicarbonate in the crystallization process results in a sodium bicarbonate-containing slurry that exits the crystallization tank and is subsequently fed into the pressurized stripping column. Sodium bicarbonate has a lower decomposition temperature than does potassium bicarbonate. Thus, at the same temperature for stripping, the sodium bicarbonate-containing slurry has a higher carbon dioxide equilibrium partial pressure than does the potassium bicarbonate-containing slurry. As a result of its lower decomposition temperature, the sodium bicarbonate-containing slurry may produce a carbon dioxide stream at a higher pressure and may reduce the subsequent compression needed to produce a sequestration-ready carbon dioxide product.

In the present invention, increasing the absorption temperature and reducing the conversion rate of carbonate to bicarbonate during the absorption process will increase the reaction kinetics in the liquid phase. If increasing the absorption temperature and reducing bicarbonate conversion rate together does not accelerate chemical reaction to a desired level, then the absorption process can be accelerated by increasing the liquid holding in the absorption column.

In the present invention, the following configuration can be used to increase the liquid holding in the absorption column. A tray column (e.g., sieve tray, valve tray or bubble cap tray) can be employed. To reduce the gas molecule concentration (dissolved molecular carbon dioxide concentration) in the liquid phase, the liquid on each tray in the absorption column can be continuously extracted by a liquid pump and sent to a tank. In the tank, the chemical reaction can be carried out to completion given the necessary residence time. Following completion of the chemical reaction, the liquid can be pumped back into the tray. The pumping rate can be determined by the gas phase mass transfer rate and the liquid phase mass transfer rate. The size of the tank can be determined by the residence time required to complete the chemical reaction. In general, the slower the liquid chemical reaction, the larger the tank and the faster the gas phase or liquid phase mass transfer rate, the higher the pumping speed. Thus, by pumping liquid around on each tray, the liquid holdup in the absorption column can be varied without having to increase the pressure drop in the absorption column.

Based on the use of the absorption process of the present invention, at least one of the following advantages over conventional absorption processes may be demonstrated.

High absorption temperature, low conversion rate of carbonate to bicarbonate and high liquid holding in the absorption column can result in improved absorption kinetics;

lower heat of absorption of carbon dioxide into carbonate solution which is about 7 kcal/mol carbon dioxide;

presence of a crystallization step to generate bicarbonate slurry for regeneration;

thermal stability of potassium bicarbonate and sodium bicarbonate solutions can enable pressurized stripping;

elimination of flue gas desulfurization process;

lower total energy required for the regeneration process;

low or no solvent degradation can result in lower operating costs; and cooling of the carbon dioxide-containing gas stream is not needed prior to entering the absorption column.

Whereas particular embodiments of the invention have been described herein for purposes of illustration, it will be evident to those skilled in the art that numerous variations of the details may be made without departing from the invention as set forth in the appended claims.

The invention claimed is:

1. A process for reducing the amount of carbon dioxide in a carbon dioxide-containing gas stream comprising:
   introducing said carbon dioxide-containing gas stream and a carbonate-containing solution into a chamber;
   contacting said carbon dioxide-containing gas stream and said carbonate-containing solution in said chamber such that at least a portion of carbon dioxide from said carbon dioxide-containing gas stream is absorbed in the carbonate-containing solution;
   converting at least a portion of said carbon dioxide and said carbonate in said carbonate-containing solution to bicarbonate to produce a carbon dioxide-, bicarbonate-, carbonate-containing solution;
   transferring at least a portion of heat from the carbon dioxide-, bicarbonate-, carbonate-containing solution exiting the chamber to the carbonate-containing solution such that the temperature in the chamber is from about 50° C. to about 90° C.;
   precipitating a bicarbonate-containing solid out of said carbon dioxide-, bicarbonate-, carbonate-containing solution;
   concentrating said bicarbonate-containing solid to a bicarbonate-containing slurry; and
   stripping said bicarbonate-containing slurry to produce a carbon dioxide product,
   wherein the stripping is carried out in a pressurized stripping column having a pressure in the range of from 5 to 60 bar.

2. A process for reducing the amount of carbon dioxide in a flue gas stream which is generated from a fossil fuel combustion system comprising:
   introducing said flue gas stream and a carbonate-containing solution into an absorption column;
   contacting said flue gas stream with said carbonate-containing solution in said absorption column;
   reacting carbon dioxide in said flue gas stream with carbonate in said carbonate-containing solution to produce a carbon dioxide-, bicarbonate-, carbonate-containing solution;
   transferring at least a portion of heat from the carbon dioxide-, bicarbonate-, carbonate-containing solution exiting the chamber to the carbonate-containing solution such that the temperature in the chamber is from about 50° C. to about 90° C.;
   precipitating in a separating chamber a bicarbonate-containing solid out of said carbon dioxide-, bicarbonate-, carbonate-containing solution, wherein said separating chamber includes a carbon dioxide-, bicarbonate-, carbonate-containing solvent that has a solubility of bicarbonate in water that is less than the solubility in water of said carbon dioxide-, bicarbonate-, carbonate-containing solution in said absorption column;
   concentrating said bicarbonate-containing solid to form a bicarbonate-containing slurry;
   stripping said bicarbonate-containing slurry in a pressurized stripping column to produce a carbon dioxide product, wherein said stripping column has a pressure in the range of from 5 to 60 bar.

3. The process of claim 2 wherein a discharge solution from the separating chamber is heated in a heat exchanging mechanism and introduced into the absorption chamber.

4. The process of claim 2 wherein a carbonate-containing solution discharged from the pressurized stripping column is cooled and ultimately recycle to the absorption column.

5. The process of claim 2 wherein the separating chamber further comprises a sulfate removal system.

* * * * *